United States Patent
Breuer et al.

(10) Patent No.: US 8,391,861 B2
(45) Date of Patent: Mar. 5, 2013

(54) FLEXIBLE SHARING OF MEASUREMENT GAPS

(75) Inventors: Volker Breuer, Bötzow (DE); Jukka Ranta, Kaarina (FI)

(73) Assignee: Nokia Siemens Networks Oy, Espoo (FI)

( * ) Notice: Subject to any disclaimer, the term of this patent is extended or adjusted under 35 U.S.C. 154(b) by 267 days.

(21) Appl. No.: 12/866,282

(22) PCT Filed: Feb. 5, 2009

(86) PCT No.: PCT/EP2009/000807
§ 371 (c)(1),
(2), (4) Date: Aug. 30, 2010

(87) PCT Pub. No.: WO2009/098062
PCT Pub. Date: Aug. 13, 2009

(65) Prior Publication Data
US 2011/0009117 A1     Jan. 13, 2011

(30) Foreign Application Priority Data
Feb. 6, 2008 (EP) ................................. 08002239

(51) Int. Cl.
*H04W 4/00* (2009.01)

(52) U.S. Cl. ........ 455/434; 455/436; 455/437; 455/438; 455/439; 455/440; 455/441; 455/442; 455/443; 455/444

(58) Field of Classification Search ........... 455/436–444
See application file for complete search history.

(56) References Cited

U.S. PATENT DOCUMENTS

| | | | |
|---|---|---|---|
| 2003/0096611 A1 | 5/2003 | Cooper | 455/434 |
| 2006/0160490 A1 | 7/2006 | Melero | 455/67.11 |
| 2006/0223557 A1* | 10/2006 | Manohar | 455/502 |
| 2007/0110022 A1* | 5/2007 | Palenius et al. | 370/350 |
| 2009/0042601 A1* | 2/2009 | Wang et al. | 455/553.1 |
| 2009/0046641 A1* | 2/2009 | Wang et al. | 370/329 |

FOREIGN PATENT DOCUMENTS
WO    WO 2004/091231 A1    10/2004

* cited by examiner

*Primary Examiner* — Olumide T Ajibade Akonai
*Assistant Examiner* — Edward Zhang
(74) *Attorney, Agent, or Firm* — Harrington & Smith

(57) ABSTRACT

The present invention relates to a method, apparatuses, a system, and a computer program product for generating measurement gaps in a data transfer between a wireless terminal device and a wireless access network. A sharing indicator is signaled from the wireless access network to the wireless terminal device, and is used at the wireless terminal device to control allocation ratios of the measurement gaps to different radio access technologies.

23 Claims, 4 Drawing Sheets

FLEXIBLE SHARING OF MEASUREMENT GAPS

FIELD OF THE INVENTION

The present invention relates to a method, apparatuses, and a system for controlling usage of measurement gaps in a wireless network environment.

BACKGROUND OF THE INVENTION

The performance of digital handsets generally has been improving over the years with respect to functionality, performance, and battery life. Handset performance is being addressed by the introduction of $3^{rd}$ generation (3G) technology, with higher data rates and better provision for new services. One key consideration is the need for the 3G networks to more than just coexist but handover active calls/data sessions with the current 2/2.5G networks. Where 3G coverage is absent, the user will need to utilize the 2/2.5G network, bringing with it the requirement for the phone to support both radio access technologies (RATs). For this reason, 3G phones often support at least two RATs.

Not only must the phone be able to search for either type of network at power-up, but also to re-select the network type when moving out of the 3G coverage area. During a call, that call must be "handed over" from one network type to the other without the user being aware of it happening. Testing this capability is potentially a complex process, involving many different network elements. Intersystem handover is the process of maintaining a phone connection while moving from one cell to another of a different radio access technology. A number of solutions have been developed to overcome the problems specifically associated with intersystem handover between different RATs. These include the use of dual-mode user equipment (UE), compressed-mode channel measurements, cell re-selection, cell change order, and inter-RAT handover. In addition, by embedding messages in one RAT as if it was of the other has made it possible to leave networks which are specific to a particular RAT unchanged.

In an intersystem handover process, the UE must perform signal strength/quality measurements of the intended RAT. Because the UE is occupied with the existing RAT and the measurement process must be performed simultaneously, a transmission gap has been made available to do inter-frequency measurements. In Global System for Mobile communication (GSM), such idle gaps exist, as it's a time division multiple access (TDMA)-based technology. The Universal Mobile Telecommunications System (UMTS) Terrestrial Radio Access Network (UTRAN) system is a code division multiple access (CDMA)-based system and measurement gaps can be created by using a compressed mode. Measurement reporting is a major element of the intersystem handover process. To initiate the procedure, the UTRAN may transmit a measurement control message or information to the UE, including the measurement identification (ID) and type of measurement to initiate. When the reporting is completed, the UE sends a measurement reporting message back to the UTRAN with the measurement ID and the results. The message is broadcast in idle mode within the system information. When the UE monitors base stations on other RATs, the UTRAN must direct the specific measurement needed to fulfill the requested handover.

In long term evolution (LTE) systems, a UE in active mode (e.g. LTE_ACTIVE) measures neighbour cells that are included in inter-frequency and inter-RAT system cells as well as intra-frequency cells to perform handover. Hence, a measurement gap is necessary to turn to neighbour cells for LTE inter-frequency or inter-RAT measurements (i.e. monitoring GSM/UMTS). To ease signalling and the specification handling, one single measurement gap duration (e.g. 6 ms) could be used for example for LTE inter-frequency, UMTS and GSM measurements. Such a single gap has advantages for signalling and implementation making it less complex.

FIG. 4 shows a schematic representation of a data stream with intermediate transmission gaps G1, G2 arranged between transmission periods T1 to T3. In case that several RATs are configured in the measurement control information, a uniform handling in the UEs needs to be ensured to have similar behaviour of terminals. Furthermore, mobility testing is believed to be more difficult, i.e. what is the amount of gaps to be considered to be used for a specific technology in case that more than one technology is present, if not indicated?

Autonomous usage of measurement gaps by the UE would not allow any control from network side and in case of different implementations of the UE measurement state machine in different terminals, different performance may be seen from terminal to terminal which is a drawback from network perspective only being able to rely on the minimum performance.

In UMTS measurement gaps can be provided on a flexible basis concerning size and periodicity, which leads to an increased complexity. In addition each measurement opportunity (compressed mode gap) can have its designated purpose for e.g. FDD (frequency division duplex) measurement, GSM carrier RSSI (received signal strength indicator), BSIC (base station identity code) identification, GSM BSIC re-confirmation etc., so that scheduling of measurement gaps becomes very complex and inflexible. The exact usage of gaps among technologies is clearly indicated, which allows exact prediction of the maximum time it will take for a UE to identify a certain cell of a RAT and corresponding definition of performance requirements.

However, considering the required amount of signaling such an approach can be disadvantageous, e.g., for LTE system.

SUMMARY OF THE INVENTION

It is an object of the present invention to provide a mechanism for handling measurement gaps for multiple RATs at low additional signaling overhead.

This object is achieved by a method comprising:
generating measurement gaps in a data transfer between a wireless terminal device and a wireless access network; and
signaling a sharing indicator from said wireless access network to said wireless terminal device; and
using said sharing indicator at said wireless terminal device to control allocation ratios of said measurement gaps to different radio access technologies.

Additionally, the above object is achieved by an apparatus comprising:
transmission control means for generating measurement gaps in a downlink data transfer to a wireless terminal device; and
signaling means for signaling a sharing indicator to said wireless terminal device, said sharing indicator indicating allocation ratios of said measurement gaps to different radio access technologies.

Furthermore, the above object is achieved by an apparatus comprising:
receiving control means for controlling wireless reception in a cellular system in a manner so that during measurement gaps reception is temporarily switched to a non-serving cell which does not serve said apparatus; and allocation control means for using a sharing indicator input to said apparatus to control allocation ratios of said measurement gaps to different radio access technologies of non-serving cells.

The above method may be implemented as a computer program product comprising code means for producing the respective above steps when run on a computer device.

The above apparatuses may be implemented as network elements or nodes, access devices, fixed or mobile terminal devices, or as modules, chips or chip sets provided in these nodes, elements or devices.

Accordingly, a sharing indicator is provided, which defines the ratio of uniform gaps to be used for monitoring each individual RAT. The signaling of the sharing indicator may be initiated from the radio resource control (RRC) layer and may involve both radio access network (RAN) and terminal device (e.g. UE).

By means of the sharing indicator, LTE inter-frequency handover (HO) can be prioritized over inter-RAT HO, so that a higher probability for LTE measurements can be achieved. Moreover, unequal numbers of cells of a certain kind of RAT may be considered in the measurement control information, e.g. one GSM cell only but several LTE inter-frequency carriers, and measurements/handover can be steered into a certain direction from network side, i.e., for load distribution purposes or optimized time sharing for LTE measurements.

According to a specific but non-limiting aspect, the sharing indicator may be signaled as a part of a measurement control signaling dedicated to the wireless terminal device. It may further define a ratio of uniform measurement gaps to be used for an individual radio access technology.

The allocation ratios are selectable within a predetermined range, so that measurements of specific RATs can be prioritized.

Furthermore, the sharing indicator may be selected in dependence on at least one of a load sharing parameter, a service or data throughput to the wireless terminal device, a type of data transmitted to the wireless terminal device, and a priority parameter allocated to individual radio access technologies.

According to a first aspect with a strict sharing approach, the sharing indicator may be used to indicate how many measurement gaps out of a predetermined number of consecutive measurement gaps are allocated to an individual radio access technology. According to a more specific example, the sharing indicator may be adapted to indicate allocation ratios for more than one radio access technology.

According to a second aspect with a priority approach, the sharing indicator may be used to indicate a priority of at least one radio access technology during a predetermined time period including a plurality of the measurement gaps. According to a more specific example, the predetermined time period may correspond to a measurement period of the wireless terminal device.

Further advantageous modifications are defined in dependent claims.

BRIEF DESCRIPTION OF THE DRAWINGS

The present invention will now be described based on embodiments with reference to the accompanying drawings in which.

DESCRIPTION OF THE EMBODIMENT

In the following, embodiments of the present invention will be described based on a data transfer with unified measurement gaps in a wireless communication network.

Figure 1:
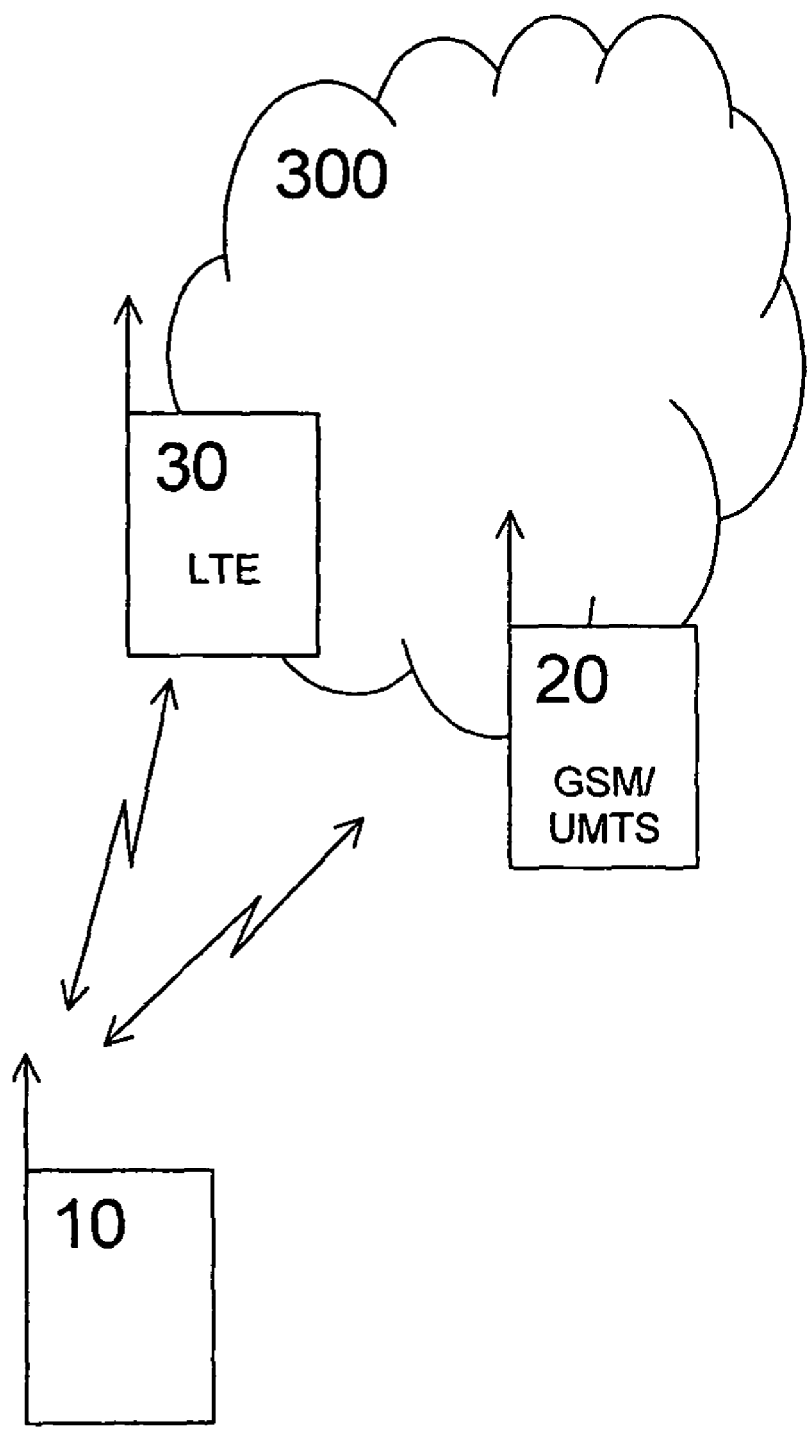
FIG. 1 shows a schematic diagram indicating a network architecture in which the present invention can be implemented.

FIG. 1 shows a schematic diagram of a general network architecture in which the present invention can be implemented. A radio access network 300, e.g., a cellular Universal Mobile Telecommunications System (UMTS) Terrestrial Access Network (UTRAN) according to the Long Term Evolution (LTE) or $3^{rd}$ Generation Partnership Project (3GPP) Release 8 standard, provides access to a UE 10 via a first access device 20, such as a GSM and/or UMTS base station device (e.g. Node B) and a second access device 30, such as an enhanced Node B (eNB) according to LTE of a neighbouring cell. It is noted that other access devices can be provided, which are not shown here.

Figure 2:
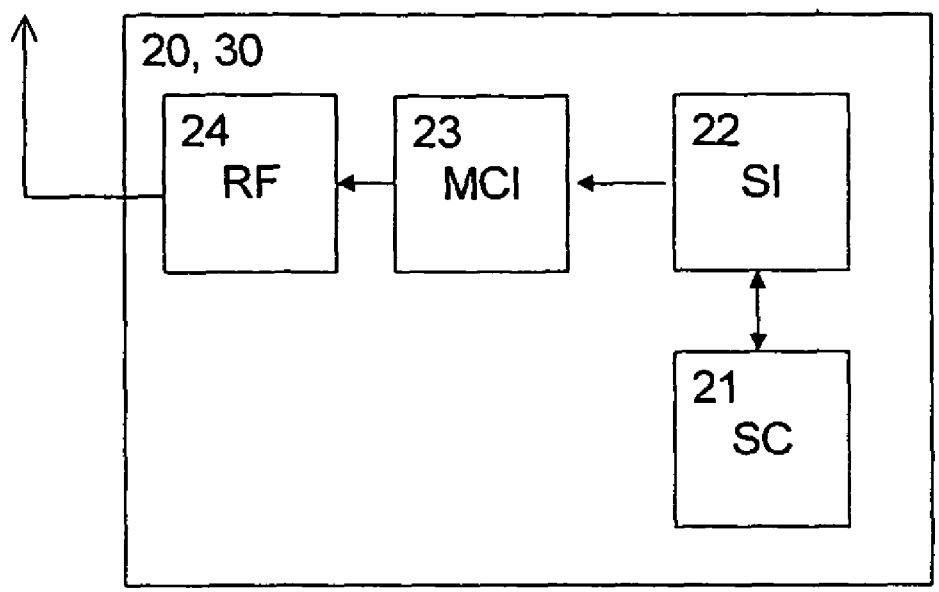
FIG. 2 shows schematic block diagrams of a terminal device and a network device according to embodiments of the present invention.
Figure 2:
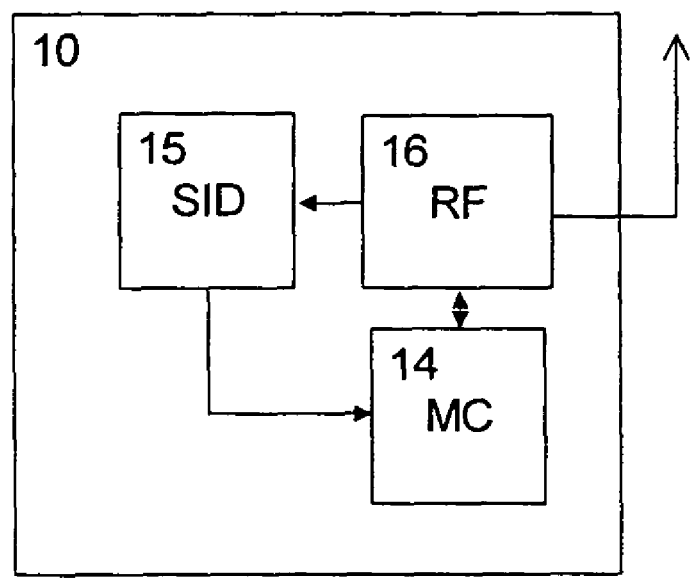

FIG. 2 shows schematic block diagrams of a terminal device or terminal (e.g. the UE 10) and a network node or network device (e.g. first or second access devices 20, 30) according to an embodiment of the present invention. At the UE 10, a measurement control information or message is checked by a sharing indicator detection (SID) functionality of an allocation control unit or controller 15 configured to control allocation of measurement gaps in a measurement control (MC) functionality or unit 14. The measurement control functionality or unit 14 may be provided as a part of an RRC functionality which controls reception operation of a receiver part of an RF front-end unit 16 which enables wireless transmission and reception via an antenna.

At the first and second access devices 20, 30, the sharing indicator is selected or set in a sharing signaling functionality or unit (SI) 22 which is controlled by a sharing control functionality or unit (SC) 21, e.g., in response to a corresponding control input which could for example be supplied by the network operator or stored in a suitable memory device (not shown). The sharing indicator is incorporated in or added to a control message (e.g. in a measurement control message or any other suitable message or signaling) in a message control information (MCI) functionality or unit 23 and transmitted via an RF front-end unit 24 and an antenna.

Figure 3:
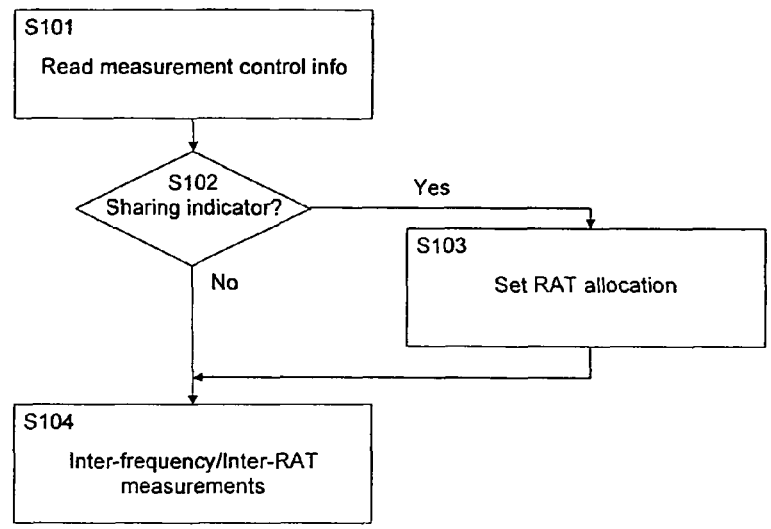
FIG. 3 shows flow diagram of a terminal-side processing according to an embodiment of the present invention.
Figure 4:
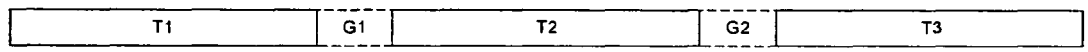
FIG. 4 shows a schematic representation of a data stream with intermediate transmission gaps.

FIG. 3 shows flow diagram of a terminal-side processing according to an embodiment of the present invention, which could be implemented based on a processing routine in the UE 10.

In step S101, the measurement control information is received and it is checked in step S102 whether a sharing indicator is provided. If not, the procedure continues at step S104 and inter-frequency or inter-RAT measurements are initiated within the provided measurement gaps based on a default sharing or allocation to different RATs. Otherwise, if a sharing indicator is detected in step S102, the procedure branches to step S103 and a RAT allocation is set in accordance with the allocation information given in the sharing indicator. Then, the procedure proceeds to step S104 and inter-frequency or inter-RAT measurements are initiated within the provided measurement gaps based on the new RAT allocation.

The sharing indicator may be part of the dedicated measurement control signalling to the UE 10. The indicated allocation or sharing of the measurement gaps between the RATs may be selectable or settable within certain ratios, e.g. allowing intra LTE mobility taking a major role by giving LTE inter-frequency measurements a higher priority.

Furthermore, the sharing or allocation ratio may be influenced by other parameters or circumstances e.g. load sharing between carriers or RATs, optimizing identification for certain RAT-technologies. Furthermore, the sharing or allocation ratio may also depend on the service or data throughput the UE 10 is receiving, i.e. a high data rate user should primarily look to LTE (e.g. second access device 30), while GSM/GPRS (e.g. first access device 20) technology may only act as emergency fallback. Moreover, for e.g. voice users, GSM may be a preferred technology to consider, so that in this case allocation priority may be given to GSM.

However, the ratio in which measurement sharing is settable should not be too brought as there are some practical limits e.g. considering drift and other effects or leading to too long identification times for certain RATs, which do not make sense in the measurement control at all.

Furthermore a priority indication for different RAT carriers (e.g. LTE carriers) may be considered. As an example, in case LTE is deployed on a 900 MHz carrier for coverage reasons, in dense areas a second carrier of wider bandwith may be used for capacity reasons (e.g. LTE inter-frequency priority may be set to "1") and a third LTE inter-frequency carrier (if available even in higher frequency ranges) may be used for HNBs (LTE inter-frequency prio=2).

In the following, two possible implementation examples of the proposed sharing indicator are explained in more detail.

According to a first implementation example, the sharing indicator is used in a strict sharing approach where a ratio of gaps to be used for individual RATs is signalled. E.g., out of a predetermined number of consecutive measurement gaps, every $2^{nd}$, $3^{rd}$, or $4^{th}$ gap could be allocated to a predetermined RAT in accordance with the sharing indicator. In case the sharing indicator signals a strict sharing or allocation (LTE: UMTS:GERAN)=(2:1:1), then 2 out of 4 have to be used for LTE, 1 out of 4 for UMTS and 1 out of 4 for GERAN. The results are thus clearly predictable.

According to a second implementation example, the sharing indicator is used in a priority approach where a priority allocation is indicated over a given time period. Hence, priority sharing can be achieved within the measurement period of the UE 10 or any other fixed time instant. Here, the total amount of measurement gaps has to be shared among the technologies present in the measurement control information as indicated, while the actual distribution within the measurement period is up to the UE 10. Thus, the priority approach allows some flexibility to the UE 10 how to perform the measurements and optimize implementation. In addition it also leads to clear predicable results related to overall performance to be expected.

The fixed time period over which measurements are shared does not need to be related to the measurement period. It can be in a more general way any available time period.

For example, in case of (LTE:UMTS:GERAN)=(2:1:1) priority-based sharing, the UE 10 would in the worst case start to measure LTE cells requiring gap assistance from second half of the measurement period onwards and may use all measurement gaps for that purpose.

Giving the advantage of implementation freedom and allowing an optimized implementation in the UE 10 the above priority approach provides a reasonable amount of network control of measurements while still allowing optimized implementation in the UE 10.

Figure 5:
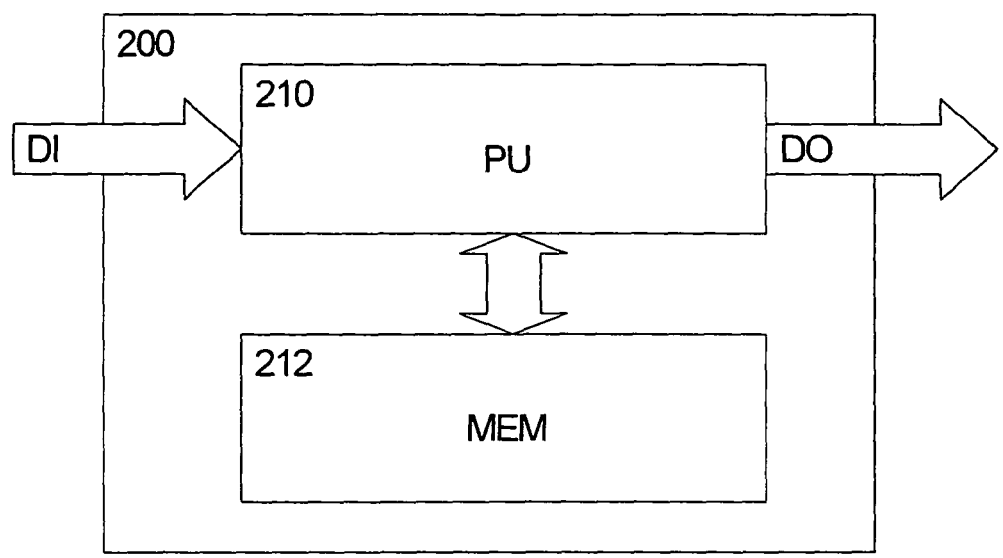
FIG. 5 shows a schematic block diagram of a software-based implementation according to an embodiment of the present invention.

FIG. 5 shows a schematic block diagram of an alternative software-based implementation of the above embodiment and its implementation examples for achieving flexible sharing of measurement gaps among different RATs. The required functionalities can be implemented in a processing unit 210, which may be any processor or computer device with a control unit which performs control based on software routines of a control program stored in a memory 212. The control program may also be stored separately on a computer-readable medium. Program code instructions are fetched from the memory 212 and are loaded to the control unit of the processing unit 210 in order to perform the processing steps of the above functionalities of FIGS. 2 and 3, which may be implemented as the above mentioned software routines. The processing steps may be performed on the basis of input data DI and may generate output data DO. At the network side the input data DI may correspond to an input of the desired sharing or allocation to be signalled by the sharing indicator and at the terminal side the input data DI may correspond to the received sharing indicator, while at the network side the output data DO may correspond to the control message with the added sharing indicator and at the terminal side the output data DO may correspond to the control output for the measure control unit 14 of FIG. 2.

Consequently, the above embodiments may be implemented as a computer program product comprising code means for generating each individual processing step when run on a computer device or data processor of the first and second access devices 20, 30 or terminal device (e.g. UE 10), respectively.

In summary, a method, apparatuses, a system, and a computer program product have been described for generating measurement gaps in a data transfer between the wireless terminal device 10 and the wireless access network 300. A sharing indicator is signaled from the wireless access network to the wireless terminal device 10, and is used at the wireless terminal device 10 to control allocation ratios of the measurement gaps to different radio access technologies.

It is apparent that the invention can easily be extended to any transmission link for any kind of control message in any kind of wireless network which supports usage of measurement gaps. Specifically, the present invention is not intended to be restricted to cellular networks. The embodiment may thus vary within the scope of the attached claims. Furthermore, while the invention has been described mainly for the case that the Node B 20 is the network device and the UE 10 is the terminal device, other devices can take the respective role as well.

The invention claimed is:

1. A method comprising:
    a) generating measurement gaps in a data transfer between a wireless terminal device and a wireless access network; and
    b) signaling a sharing indicator from said wireless access network to said wireless terminal device; and
    c) using said sharing indicator at said wireless terminal device to control allocation ratios of said measurement gaps to different radio access technologies, wherein said allocation ratios are selectable within a predetermined range; and
    d) using said sharing indicator to indicate how many measurement gaps out of a predetermined number of consecutive measurement gaps are allocated to an individual radio access technology.

2. The method according to claim 1, further comprising signaling said sharing indicator as a part of a measurement control signaling dedicated to said wireless terminal device.

3. The method according to claim 1, wherein said sharing indicator defines a ratio of uniform measurement gaps to be used for an individual radio access technology.

4. The method according to claim 1, further comprising selecting said sharing indicator in dependence on at least one of a load sharing parameter, a service or data throughput to said wireless terminal device, a type of data transmitted to said wireless terminal device, and a priority parameter allocated to individual radio access technologies.

5. The method according to claim 1, wherein said sharing indicator is adapted to indicate allocation ratios for more than one radio access technology.

6. The method according to claim 1, further comprising using said sharing indicator to indicate a priority of at least one radio access technology during a predetermined time period including a plurality of said measurement gaps.

7. The method according to claim 6, wherein said predetermined time period corresponds to a measurement period of said wireless terminal device.

8. A computer program product comprising a non-transitory computer-readable medium storing code means for generating the steps of method claim 1 when run on a computer device.

9. An apparatus comprising:
a) transmission control means for generating measurement gaps in a downlink data transfer to a wireless terminal device; and
b) signaling means for signaling a sharing indicator to said wireless terminal device, said sharing indicator indicating allocation ratios of said measurement gaps to different radio access technologies; and
c) setting means for setting said allocation ratios within a predetermined range, wherein said setting means is adapted to set said sharing indicator so as to indicate how many measurement gaps out of a predetermined number of consecutive measurement gaps are allocated to an individual radio access technology.

10. The apparatus according to claim 9, wherein said signaling means is adapted to signal said sharing indicator as a part of a measurement control signaling dedicated to said wireless terminal device.

11. The apparatus according to claim 9, wherein said sharing indicator defines a ratio of uniform measurement gaps to be used for an individual radio access technology.

12. The apparatus according to claim 9, wherein said signaling means is configured to select said sharing indicator in dependence on at least one of a load sharing parameter, a service or data throughput to said wireless terminal device, a type of data transmitted to said wireless terminal device, and a priority parameter allocated to individual radio access technologies.

13. The apparatus according to claim 9, wherein setting means is adapted to set said sharing indicator so as to indicate allocation ratios for more than one radio access technology.

14. The apparatus according to claim 9, wherein said setting means is adapted to set said sharing indicator so as to indicate a priority of at least one radio access technology during a predetermined time period including a plurality of said measurement gaps.

15. The apparatus according to claim 14, wherein said predetermined time period corresponds to a measurement period of said wireless terminal device.

16. A system for signaling control information, said system comprising at least one apparatus according to claim 9.

17. An apparatus comprising:
a) receiving control means for controlling wireless reception in a cellular system in a manner so that during measurement gaps reception is temporarily switched to a non-serving cell which does not serve said apparatus; and
b) allocation control means for using a sharing indicator input to said apparatus to control allocation ratios of said measurement gaps to different radio access technologies of non-serving cells wherein said allocation ratios are set-within a predetermined range, and wherein said sharing indicator is set so as to indicate how many measurement gaps out of a predetermined number of consecutive measurement gaps are allocated to an individual radio access technology.

18. The apparatus according to claim 17, wherein said allocation control means is adapted to receive said sharing indicator as a part of a measurement control signaling dedicated to said apparatus.

19. The apparatus according to claim 17, wherein said sharing indicator defines a ratio of uniform measurement gaps to be used for an individual radio access technology.

20. The apparatus according to claim 17, wherein said sharing indicator indicates a priority of at least one radio access technology during a predetermined time period including a plurality of said measurement gaps.

21. The apparatus according to claim 20, wherein said predetermined time period corresponds to a measurement period used in said apparatus.

22. A system for signaling control information, said system comprising at least one apparatus according to claim 17.

23. The apparatus according to claim 17, wherein said sharing indicator is set so as to indicate allocation ratios for more than one radio access technology.

* * * * *